(12) United States Patent  
Moorman

(10) Patent No.: US 7,549,418 B1
(45) Date of Patent: Jun. 23, 2009

(54) METHOD AND DEVICE FOR CAPTURE, STORAGE AND RECIRCULATION OF HEAT ENERGY

(76) Inventor: William E. Moorman, 8589 Dundee La., Gloucester, VA (US) 23061

( * ) Notice: Subject to any disclaimer, the term of this patent is extended or adjusted under 35 U.S.C. 154(b) by 0 days.

(21) Appl. No.: 12/053,614

(22) Filed: Mar. 23, 2008

(51) Int. Cl.
*F24J 2/46* (2006.01)

(52) U.S. Cl. .................. 126/623; 126/628; 126/633; 126/634

(58) Field of Classification Search ............ 126/623, 126/628, 633, 634, 643, 646, 647, 714
See application file for complete search history.

(56) References Cited

U.S. PATENT DOCUMENTS

| 4,052,975 | A | * | 10/1977 | Ceideburg | 126/572 |
| RE31,321 | E | * | 7/1983 | Harrison | 126/585 |
| 6,147,295 | A | * | 11/2000 | Mimura et al. | 136/246 |

\* cited by examiner

*Primary Examiner*—Alfred Basichas
(74) *Attorney, Agent, or Firm*—Duncan G. Byers, Esq.

(57) ABSTRACT

A heat generation and storage device supplements building heating and hot water systems. A roof cap including an air passage is connected to air outlets disposed within the roof structure of a building and to air passages formed by panels mounted over the surface of a building's roof. The roof cap is connected to a vent which either exhausts air to the atmosphere and/or recirculates air to a liquid heat storage tank. Heated air and heated water from the storage tank supplement a building's heating and hot water systems.

20 Claims, 3 Drawing Sheets

METHOD AND DEVICE FOR CAPTURE, STORAGE AND RECIRCULATION OF HEAT ENERGY

This Application claims the benefit of U.S. application Ser. No. 11/764,215 filed on Jun. 17, 2007.

BACKGROUND OF THE INVENTION

1. Field of the Invention

This invention relates to the capture, storage and recirculation of heat energy in residential and commercial buildings. The present invention is intended to be incorporated into new construction, although the present invention may be utilized in pre-existing buildings as well. In general, the present invention provides means to capture, store, and recirculate heat generated within a structure, and more specifically provides for the storage of heat energy that is generated or collected at or near the highest point of a structure. Heated air is generated at the roof of a building due to natural processes and/or design features incorporated into a building's structure. The heated air is redirected into a storage facility beneath a structure, and the storage facility utilizes the heated air to warm a body of water that is then utilized for both potable water heating and heating of the building. In addition, the heated air output from the storage facility is utilized to supplement the building's heating system.

Heated air within a building rises; a natural result of this convective flow causes heated air to collect at or near the underside of the peak of the structure. Adding to the temperature rise under the roof structure is the effect of sunlight on a roof. In particular, sunlight on the surface of a roof, and in particular on roof shingles, causes an increase in the temperature of the air underneath the roof surface. This accumulation of additional heat, in addition to being of waste of available energy, causes degradation of the structure of a roof and increases the rate of deterioration of roof shingles. In current designs, much if not all of that heat generated either remains unutilized in the attic or top space of the interior of the building, or is lost to the environment.

While collecting and recirculating heated air that either accumulates or is generated on or under the roof of a structure is desirable to cool the roof structure, such a system loses heat that could be stored for later use. The heat energy generated during the day may be stored for use after dark when the ambient temperature both inside and outside of a structure decreases. The stored heat may be used to maintain a comfortable temperature inside of a structure.

Present designs for cooling roof structures waste significant heat energy that may be recaptured, stored, and utilized within the structure itself, reducing overall heat loss within the structure. Further, although previous designs have provided means for the capture of heat energy from the sun on the roofs of buildings, those previous designs rely upon complicated fluid circulation systems that are costly, inefficient, and difficult to maintain. And, failures of such systems can be catastrophic; water ruptures and leakage can result in significant structural damage.

What is needed is a method of enhancing the cooling of a roof structure while providing the option of simultaneously supplementing a building's heating system. What is further needed is a method of capturing and storing, for later use, heat energy that is either created or collected at the peak of a structure. Such a system should utilize solar energy to generate heating for the building, carry heat away from the roof to reduce structural heating and shingle degradation, supplement the existing heating system of the building, and provide means to store heat energy for later use and convert the heat energy so that it may be utilized in a building's other systems requiring a heat source.

It therefore an object of the present invention to generate heat energy from solar energy at the roof of a structure. It is a further object of the present invention to provide means to carry heat away from the roof of a structure, and divert the heat for recirculation within a structure to either supplement or replace the need for common heat sources such as furnaces, electrical heat devices, heat pumps, and the like. It is yet a further object of the present invention to convert collected heat energy for storage and heating of a building's heated water supplies. The present invention comprises an air capture and circulation system wherein a roof cap structure, vent, heated air collecting panels, and circulation devices are used in combination to prevent heated air rising from the eaves to the ridge during winter months from escaping into the atmosphere, and to channel that heated air from the ridge area to a storage means for later use.

2. Description of the Prior Art

Various methods have been used to store heat for later use within a structure. For example, U.S. Pat. No. 5,038,850 to Choi is for a "Cooling and Heat Accumulating Type Electrical Cooling and Heating System and Method for Implementing the Same." The Choi invention teaches a heat and cooling accumulation chamber. However, the Choi invention utilizes electric power for the heat generation in the device. Further, the Choi invention relies upon forced flow of air to provide heating or cooling flow out of the heat and cooling accumulation chamber.

U.S. Pat. No. 4,285,332 issued Aug. 25, 1981 to McHugh teaches a "Building Having Solar Heating System." The McHugh invention provides for the capture of solar heat through a circulation system. The invention of McHugh, however, requires the flow of water through the structure, which requires that the water to be circulated and heated is built into the structure itself. The McHugh invention further requires (as does most solar heat prior art) a water or other liquid being circulated within a closed system to capture and store the solar heat.

U.S. Pat. No. 4,000,851 issued Jan. 4, 1977 to Heilemann teaches a "Solar-Heated Dwelling." That invention, as with the McHugh patent, teaches water flow for the capture of solar heat energy. The Heilemann invention further teaches a heat reservoir beneath the structure. However, the Heilemann, as with the McHugh invention, relies upon water flow to carry heat from the rooftop solar panels. In addition, the heat reservoir relies upon a set of rocks to store heat from the solar panels. This system is inherently inefficient in that the heat to be stored must be gathered by water at the roof, where the pipes carrying the liquid must be heated, and thence the water within the pipes. This heated water must then be circulated down to the bottom of the structure, where the heat to be stored must be passed out of the water, through the pipe walks, through the ambient air within the reservoir, and then into the rocks. The Heilemann invention then relies upon the rocks to heat the floor slab of the structure, which in turn theoretically provides heat to the overlying room. The Heilemann system is not only inefficient to the extent that it requires a structurally and mechanically complicated system, but it is further undesirable in that the circulation of water in the system poses a significant threat of structural damage and costly repairs should part of the system fail. In addition, the multiple processes required for the transfer of heat to the structure are sources of significant inefficiencies.

Similarly, U.S. Pat. No. 4,000,850, issued Jan. 4, 1977 to Diggs for "Solar Heated and Cooled Modular Building"

teaches a system for the capture and storage of heat collected at the roof of a structure. As with the Heilemann invention, however, the Diggs invention requires a water circulation system to collect and transport heat energy from the roof of a structure. In addition, these preexisting systems do little to reduce the temperature of the liquid being circulated prior to the liquid being returned to the rooftop heat source. Because the heat transfer into and out of the circulating liquid is limited, the capacity to capture more heat by the water is limited, thereby reducing the efficiency of the system.

U.S. Pat. No. 4,484,566, issued Nov. 27, 1984 to Gonzalez for "Solar Collector Panel and Heat Storage System" teaches a system designed to capture and store heat from the sun. In particular, the Gonzalez invention teaches a solar heating system that relies upon solar panels and a water tank storage system. The solar panels taught by Gonzalez incorporate circuitous air flow passages intended to increase the residence time of air within the solar panels. The Gonzalez invention further teaches the water tank storage of heat energy generated within the taught solar panels. The water storage tank, in turn, provides heated air to the structure located above the water-storage tank. However, the Gonzalez system provides at best an inefficient means to remove unwanted heat from the system or the structure itself; having a heat removal process is critical for efficient building climate control. In addition, the Gonzalez design requires the reversal of ambient flow within the structure of the solar panels that are intrinsic to the Gonzalez design. Without forced air flow to counteract the natural rise of heated air, heated air within the Gonzalez solar panels will collect and become trapped inside the solar panel structure. As an additional limitation, the Gonzalez-invention teaches a closed system wherein there is no opportunity to refresh the air within the system with air replenished from outside of a structure. There is also no means of utilizing natural air flow mechanisms to capture, store, and vent heated air. And even though the Gonzalez invention teaches a water tank as means to trap and store collected heat energy, the invention is limited in that the water tank only utilizes the heat energy collected within the water tank to provide heat energy to the ambient air moving up and into a structure, and makes no other use of the heat energy trapped within the water stored within the tank. Finally, the Gonzalez invention is inherently inefficient in that it only provides limited control in response to seasonal variations in ambient temperature.

None of these previous inventions provide means for enhancing the heat collection at the roof of a structure. Nor do they provide an efficient means for the collection and storage of the heat energy collected. The Heilemann, Diggs, and Gonzalez inventions, the heat storage means does not provide efficient means for removing the heat energy from the circulated heat collecting medium. Nor do any of the systems make full utilization of heat trapped in storage means, such as a water storage tank, where such heated water may be utilized for heat and hot water supply.

What is needed, therefore, is an efficient method of storing heat to be utilized within a structure. More particularly, an efficient method of capturing, recirculating and storing heat generated at or on the roof of structure is needed where the heat is transferred directly from the collection medium into the storage medium. Such a system should also preferentially provide as simplified a system as possible so as to reduce heat losses as well as mechanical failures.

The current invention is an improvement over the prior art in that it provides a new means by which heated air that accumulates in the roof structure of buildings is captured within a roof cap structure, stored, and then circulated into the primary heating cycle of a building structure during winter months, thereby increasing the efficiency of the heat system. The present invention assists and enhances the passive air flow that results from building designs.

It is an object of the present invention to provide a heat generation, storage and recirculation system that utilizes heat collecting panels to be used during winter months to increase the amount of heated air available to direct into the primary heating system of the building structure. As an added benefit, during the summer months the current invention permits the discharge of heated air that rises to the crown from the roof area to the outside. The current invention does not require a particular building design and conveniently may be secured atop an existing roof cap, utilized to replace an existing roof cap altogether, or used in new construction. The storage portion of the present invention may be installed during construction of a building, or may be installed to an existing structure.

It is a further object of the present invention to provide a means to supplement the heating system of a structure through the generation and capture of air at the surface of a roof heated by solar energy.

It is a further object of the present invention to provide a heat generation, recirculation, and storage system that directs heated air away from the roof of a structure.

It is a further object of the present invention to store and convert heat energy to be utilized by a building's heated water systems.

SUMMARY OF THE PRESENT INVENTION

The present invention relates to a rooftop device designed to generate, capture and store heat energy within a structure. In particular, the present invention provides a method and means of generating heat from the radiant energy of the sun, storing the heat energy and utilizing that heat energy to provide both heated air and heated water to a building. The heat energy is captured at the roof of a building through an air heating apparatus, and the heated air is then used to warm a body of stored water. The heated air is further utilized to supplement the building's heating system, while the heated water is utilized for the building's potable water and heating systems.

The system disclosed herein is utilized in conjunction with conventional construction of buildings, and comprises in one embodiment (i) a roof structure to generate heated air, (ii) circulation devices and air flow direction control devices that provides the heated air to a storage tank, (iii) means for utilizing the heated air to supplement a building's heating system, and (iv) a means for conversion of the heat energy contained within the heated air to water heat.

In one embodiment of the present invention, one or more insulated water storage tanks are buried within the foundation perimeter during building construction. The present invention may also be utilized in existing buildings where the storage tank or tanks is installed either underneath the building or to the side of the building. The storage tank may be of any material that holds water or other liquid that can be used to store heat energy, but is preferably fiberglass or similar material. It is also preferable that the tank be insulated, either by incorporation of insulating design features within the construction of the storage tank itself or by affixing insulating materials around an existing storage tank. Means of insulating liquid storage tanks are well known. The size of the storage tank will depend upon the size of the building and the heating needs and hot water needs of a particular application.

While incorporating the present invention into a building, compass orientation of the structure is determined so that the heat generating portion of the invention may be installed on the substantially south-facing roof. Further, the roof structure incorporates insulation underneath the roof surface proper, the insulation may be provided under the roof sheathing and/or in the rafter gaps. Over the rafters is placed a substantially rigid black material, such as heavy plastic or rubber. The black material absorbs energy from the sun's rays, converting the energy into heat. Above this is placed a clear material so that solar radiation passes to the black surface. A gap is provided between the layers, preferentially 6"-12". The gap is closed on the sides of the roof, and is open at the eaves and at the opening at the ridgeline of the roof. At the ridge, the openings join into the collecting means (air duct) running the length of the ridge at the peak of the roof. The ridge pipe is connected to a chimney duct; the chimney duct provides vertical movement of the captured heated air, either venting to the atmosphere to assist in cooling the roof structure or circulating the air down to the storage system underneath the building.

The storage system underneath the building comprises a storage tank and means for the heated air to be directed into the storage tank. The storage tank is filled with water; the water serves to store the heat energy from the heated air. The heated air bubbles up through the water within the storage tank, transferring the heat from the air to the water, raising the temperature of the water. Once the air rises through the body of water within the tank, the air is exhausted into the crawl space under the building. The air exhausted into the crawl space heats the ground, foundation and floor of the building, and may also rise into the space within the structure through floor registers provided for that purpose. Because heated air rises, cooler air will remain within the crawl space to be vented to the atmosphere through louvered vents in the side of the foundation provided for that purpose. Water is utilized in the present invention due to its easy availability, high heat capacity, and use in a building's existing systems. Other equivalent liquids may be used, especially within the closed loop of a baseboard heating system. Those skilled in the art will recognize that closed loops within the storage tank may be utilized so that there is no mixing of fluids in the various heating systems of a building, such as the potable water system. Preferentially, however, water is utilized as a common liquid.

The water from the storage tank may be circulated within the structure through a baseboard heating system. To ensure sufficient heating to the structure, backup heating may be provided with such means as electric resistance devices, natural gas heating, and the like. The backup heating may be located within the baseboard heaters themselves, or may be located prior to the baseboard heating.

The heated water within the tank may also be utilized as a pre-heated source of hot water for cleaning and potable uses. By supplying the heated water from the storage tank to the hot water system for the building, less energy is required to heat the water for such uses, reducing the building overhead costs.

DESCRIPTION OF A PREFERRED EMBODIMENT

Figure 1:
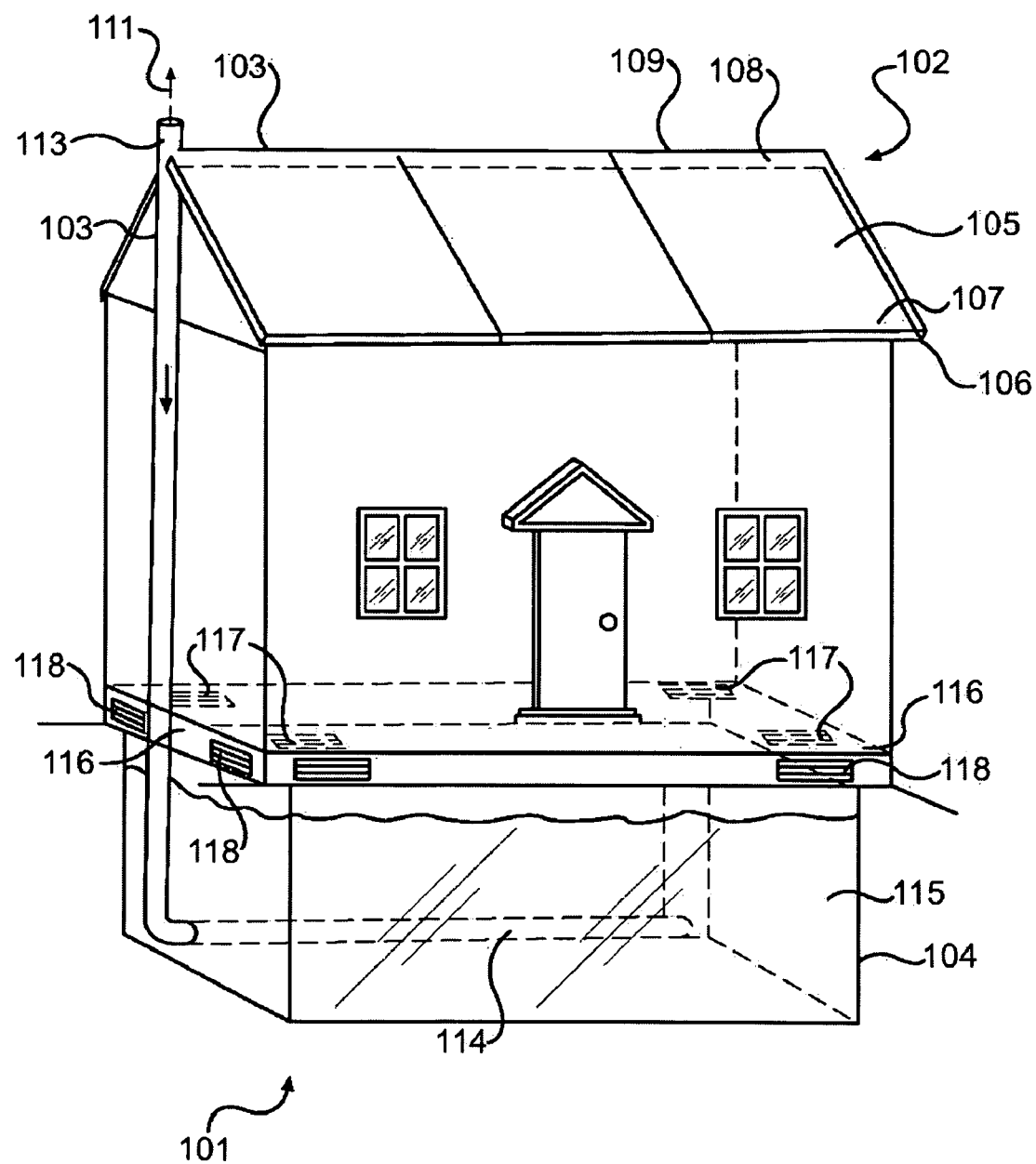
FIG. 1 is an illustration of a building incorporating the present invention.

Referring to FIG. 1 of the drawings, a heat storage system 101 comprising a rooftop heat generation and collection apparatus 102, heated air transport apparatus 103, and heat storage tank 104 is shown as incorporated into a building. The rooftop heat generation and collection apparatus 102 comprises roof panels 105 which are located above the surface of the roof 106. The roof panels 105 are substantially transparent and while various materials may be utilized for the roof panels 105, it is preferred that lightweight transparent or semi-transparent materials, such as Plexiglas® and the like, form the basis for the roof panels 105. The surface of the roof 106 is preferentially colored or coated with a non-reflective and/or black surface. In one such embodiment, heavy-gauge black plastic is used as a roof covering. It is also preferable that the spaces located underneath the roof structure are insulated; commonly available insulation materials may be utilized to insulate the structural space underneath the roof such that heat generated at the roof surface is not lost to the interior of the roof or attic space. The most efficient location of the rooftop heat generation and collection apparatus 102 is on the generally south-facing portion of the rooftop of the building; it will be understood that such a design is desired in northern latitudes, while southern latitudes may be oriented differently to maximize sun exposure on the apparatus 102.

The air space 108 located between the panels 105 and the roof 106 is connected via air passages to a air passage 108 located within the roof cap 109. The air passage 108 communicates with a vertical air passage 110, wherein the heated air from the air passage 108 in the roof cap 109 may be vented to the atmosphere 111 or directed down to the storage tank 104 via a fan and valve apparatus 113 located within the junction of the air passages 108 and 110. The design details of the rooftop portion of the present invention may further include those elements disclosed in U.S. patent application Ser. No. 11/764,215 filed on Jun. 17, 2007, which is specifically incorporated herein.

Heated air traveling downwards within the air passage 110 is directed into the storage tank 104, where the heated air flows out of the horizontal portion 114 of the air passage 110 and upwards through the water 115 inside the storage tank 104. Numerous liquids may be utilized within the storage tank. However, while other such fluids may be utilized within the storage tank 104, in a preferred embodiment water is utilized. The storage tank 104 is preferentially located below building grade such that the ambient temperature of the tank is stabilized due to stable ground temperature. The storage tank 104 may also preferentially be insulated by commonly understood means in order to reduce heat losses from the water 115.

The storage tank 104 is connected to the crawl space 116 of the structure, allowing heated air to flow upward through the water 115 and into the crawl space 116. The crawl space 116 is connected via registers 117 or the like, allowing heated air to rise into the interior portion of the building. Cooler air within the crawl space 116 is vented to the exterior of the building via vents 118 in the exterior walls of the crawl space 116.

Figure 2:
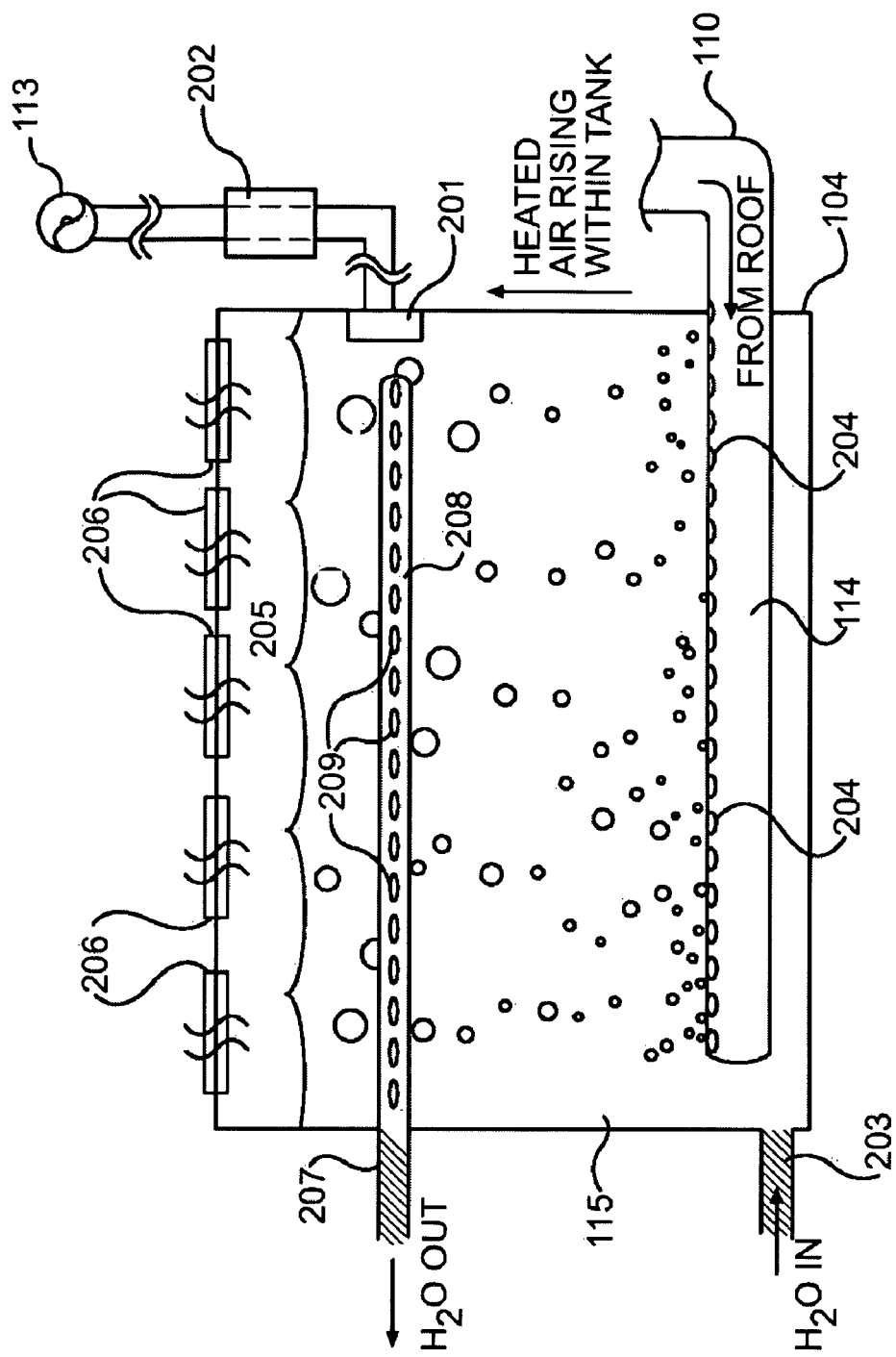
FIG. 2 is a detail of the water storage tank of the present invention.

Referring now to FIG. 2, a detail of the storage tank 104 is shown. Heated air from the rooftop heat generation and collection apparatus 102 flows downward through the air passage 110 to a horizontal portion 114. The heated air is forced downwards within the air passage 110 via a fan and valve apparatus 113. A temperature sensor 210 within the storage tank 104 provides a sensing signal to a thermostat 202 or similar control module, which in turn controls the fan and valve apparatus 113. When the water 115 temperature within the tank 104 falls below a pre-selected value, the thermostat 202 engages the fan and valve apparatus 113 to force air flow downward to the storage tank 104. Replacement water 115 is provided to the storage tank 104 via a inlet port 203. The inlet port 203 is preferentially located in the lower portion of the storage tank 104 such that the replacement water flowing into the storage tank 104, if cooler than the water 115 resident in the storage tank 104 enters in close proximity to the heated air input. In one embodiment, the inlet port 203 runs through an extension within the tank to distribute make-up water evenly within the storage tank 104 so that the water is heated evenly and reduces zones of water within the storage tank 104 that have different temperatures.

The horizontal portion 114 of the air passage 110 has a plurality of air outlets 204 along the upper surface of the horizontal portion 114. The plurality of air outlets 204 allow heated air to bubble vertically through the water 115, transferring heat to the water 115 as it does so. The air bubbles then flow into the air space 205, which is connected to the crawl space of the building. The top of the tank 104 may be open to the crawl space, but is preferentially sealed with a plurality of air vents 206 that may be utilized to control the flow of warm air into the crawl space as well as providing means to seal the top portion of the tank 104 from falling dust, debris and the like. Various means of venting air vertically while providing protection from debris are well known in the art; any of the known means may be utilized. In another embodiment of the present invention, control means may be provided for the air vents 206 such that the flow of warm air into the crawl space may be controlled remotely, either manually, automatically, or in combination thereof.

The liquid 115 within the storage tank 104 will be warmer nearer the surface in comparison to the lower portion of the storage tank 104 where cooler water exists as a result of natural convection and the cooler replacement water provided via the inlet port 203. Heated water is therefore preferentially drawn out of the storage tank 104 via a outlet port 207. As with the inlet port 203, the inlet port 201 may further comprise a length of suction pipe 208 or other withdrawing means within the water 115 of the storage tank 104. Providing a withdrawing means such as a length of suction pipe 208 with a plurality of inlet holes 209 substantially across the width of the storage tank allows the outlet water to be drawn evenly from the heated water 115 within the storage tank 104. Various means of withdrawing heated water 115 from the tank may be utilized, such as a loop of perforated suction pipe, multiple suction pipes, strainer baskets, and the like.

It will be understood that the water input supply to the storage tank may be provided through a perforated pipe running the length of the tank, flowing water into the tank evenly across the bottom of the tank rather than at a single input location, thus more efficiently spreading the water distribution within the tank and minimizing hot zones and cold zones within the body of water. It will also be understood that the outlet for drawing heated water from within the tank may comprise a similar perforated pipe or series of pipes within the tank so that heated water is drawn evenly from the tank.

It will further be understood that, although the pipes and ducts are shown for purposes of illustration without insulation, the use of insulation for pipes and ducts containing water or air that is utilized for heating and cooling is common in the art. Therefore, standard means for insulating the individual pipes and ducts within the disclosed invention may be provided without deviating from the scope of the invention.

Figure 3:
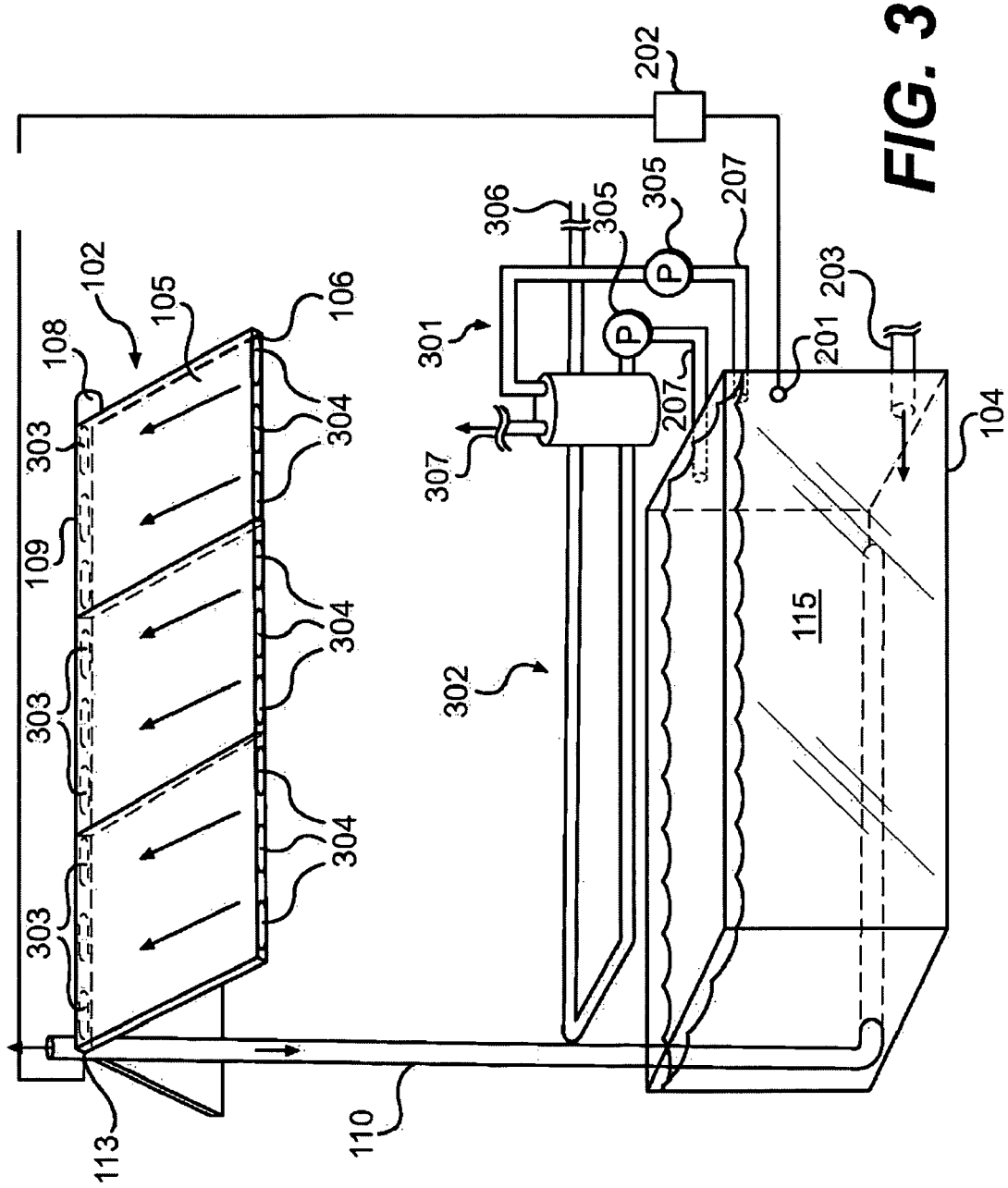
FIG. 3 is an illustration of an embodiment of the present invention.

Referring now to FIG. 3, an embodiment of the present invention is shown with the rooftop heat generation and collection apparatus 102 is connected to the storage tank 104 via the air passage 108 within the roof cap 109 and the vertical air passage 110. The storage tank 104 provides heated water to a water heater apparatus 301 as well as a baseboard heat system 302. Flow of heated air from the rooftop apparatus 102 is controlled via a sensor 201 and thermostat 202, which operate the fan and valve apparatus 113.

The rooftop apparatus 102 is shown with a plurality of roof panels 105. Air within the space between the panels 105 and the surface of the roof 106 increases in temperature as a result of sunlight striking the roof. The air within the space rises towards the top ridge of the roof, and is transferred to the air passage 108 within the roof cap 109 via a plurality of inlet means 303. A plurality of openings 304 is provided at the end of the panels 105 distal to the roof peak. Natural convective flow of the heated air causes the heated air to flow upwards into the air passage 108 within the roof cap 109, and make-up air is drawn into the apparatus through the plurality of openings 304. The roof panels 105 have sealed ends running vertically along the surface of the roof 106 such that the only air flow into or out of the space between the roof panels 105 and the roof 106 is achieved through the openings 304 and the inlet means 303.

Heated air collected within the air passage 108 flows to the vertical portion of the air passage 110, and is caused to be either vented to the atmosphere or provided to the storage tank 104 in the manner described above by operation of the temperature sensor 201 and the thermostat 202. Make-up water is provided to the storage tank inlet port 203. Heated water is drawn from the storage tank 104 via a plurality of outlet ports 207. As shown, the outlet ports 207 provide heated water to a water heater apparatus 301 as well as a baseboard heat system 302. Water pumps 305 operate to draw heated water from the storage tank 104 through the outlet ports 207 and move the heated water into the water heater apparatus 301 and the baseboard heat system 302. Once the water supplied to the water heater apparatus 301 is heated, it may be supplied 307 to the building for use. Water return 306 from the baseboard heat system 302 may be provided back to the storage tank via the inlet port 203. The hot water heater apparatus 301 and the baseboard heat system 302 described herein are merely illustrative of the uses for the water heated by the present invention. There are numerous applications within and related to the upkeep, operation, maintenance, cleaning and occupancy of a building that require heated water. For example, water spigots within a building as well as on the exterior of a building may utilize heated water. In another example, the heated water may be used to circulate within the floors and/or walls of a structure to provide supplemental heating. Numerous other applications will be readily apparent to those skilled in the art.

The water supply to the storage tank 104 may be supplied from the building's fresh water supply or other supply suitable to the end use to be made of the heated water from the storage tank. For example, if the heated water is to be used for baseboard heating purposes, the water supply need not be potable water. In another embodiment, however, potable water may be preferred to supply the building's potable hot water heater. In yet another embodiment, multiple storage tanks may be provided such that, for example, a first storage tank 104 serves the potable water system for the building, and a second storage tank 104 serves heating and other water needs, thereby separating potable from non-potable water supplies.

It will be understood by those skilled in the art that the invention as described herein is merely illustrative and that there are other embodiments that are not described herein that still fall within the scope and intent of the present invention. In particular, it will be obvious to one skilled in the art that the method of recirculating stored heat into a structure may be accomplished by various means, and the passive system described herein should not be construed as limiting.

What is claimed is:

1. An apparatus for capturing and storing heat energy for capturing and storing heat energy comprising:
    means for collecting heated air, said means comprising a plurality of substantially transparent panels, the plurality of substantially transparent panels disposed upon the roof of a building with one or more air spaces disposed between the plurality of substantially transparent panels and the surface of the roof of a building and air disposed within the one or more air spaces;
    means for communicating heated air to a liquid storage tank, said means comprising an air passage disposed within a roof cap and the air passage disposed within a roof cap communicating with the one or more air spaces between the plurality of substantially transparent panels and the surface of the roof, one or more generally vertical air passages communicatively connected to the air passage disposed within the roof cap, the one or more generally vertical air passages communicatively connected to an air passage disposed within a liquid storage tank and the air passage disposed within a liquid storage tank further comprising air outflow ports, and one or more fans disposed within an air passage;
    means for communicating heated air from a liquid storage tank to the interior portion of a building, said means comprising one or more air passages disposed generally over the surface of the liquid storage tank, the one or more air passages communicating with air space disposed over the surface of the liquid contained within the liquid storage tank and further communicating with the interior portion of a building;
    means for communicating heated air from a building to the apparatus for capturing and storing heat energy, said means comprising one or more air passages disposed within the roof building of a building and the one or more air passages disposed within the roof building of a building communicating with an air passage disposed within a roof cap; and
    means for venting air to the exterior of a building, the means comprising one or more exhaust outlets disposed within one or more generally vertical air passages.

2. The apparatus for capturing and storing heat energy of claim 1 wherein the apparatus for capturing and storing heat energy further comprises means for circulating liquid from a liquid storage tank to a water circulation system.

3. The apparatus for capturing and storing heat energy of claim 1 wherein the plurality of substantially transparent panels mounted on the surface of a roof building further comprise physical support means defining one or more passages for air flow between the plurality of substantially transparent panels and the surface of the roof of a building, means to communicate air from within the one or more air spaces to a horizontal air passage disposed within the peak of a roof building and wherein the one or more passages for air flow further comprise air intakes distal to the peak of the roof of a building.

4. The apparatus for capturing and storing heat energy of claim 1 further comprising valve means, the valve means disposed within an air passage chosen from the group comprising the one or more generally vertical air passages and the air passage disposed within the roof cap.

5. The apparatus for capturing and storing heat energy of claim 4 wherein the valve means may be selectively moved to allow air to flow from the air passage disposed within to roof cap through the one or more generally vertical air passages downward to the liquid storage tank or through outlets to the exterior of a building.

6. The apparatus for capturing and storing heat energy of claim 4 further comprising a thermostat and a temperature sensor disposed within the liquid storage tank, the thermostat electrically connected to the temperature sensor, the valve means, and the one or more fans.

7. The apparatus for capturing and storing heat energy of claim 1 wherein the liquid storage tank further comprises means to replenish the volume of liquid within the liquid storage tank.

8. The apparatus for capturing and storing heat energy of claim 1 wherein one or more air passages disposed generally over the surface of the liquid storage tank comprise one or more air vents communicatively connected to the space located under the interior portion of a building.

9. The apparatus for capturing and storing heat energy of claim 8 further comprising one or more air vents communicatively connected between the interior portion of a building and the space located under the interior portion of a building and one or more air vents communicatively connected between the space located under the interior portion of a building and the exterior of the building.

10. The apparatus for capturing and storing heat energy of claim 1 wherein the means for providing heated air from the apparatus for capturing and storing heat energy to a building further comprises one or more fans and said one or more fans are positioned to cause air to be moved from said air passage disposed within a roof cap to said one or more generally vertical air passages.

11. The apparatus for capturing and storing heat energy of claim 1 further comprising one or more air exhaust outlets to the exterior of a building.

12. The apparatus for capturing and storing heat energy of claim 1 wherein the surface of the roof further comprises a surface layer wherein the surface layer comprises a material that absorbs solar heat energy.

13. A method for capturing and storing and utilizing heat energy comprising the steps of:
    Heating air disposed within one or more air spaces, the one or more air spaces provided by a plurality of substantially transparent panels disposed upon the roof of a building, and the one or more air spaces between the plurality of substantially transparent panels and the surface of the roof of a building, and air disposed within the one or more air spaces heated by means of solar energy;
    Transferring heated air from within a plurality of air spaces by means of an air passage disposed within a roof cap, the air passage disposed within a roof cap communicating with the one or more air spaces and one or more generally vertical air passages, the one or more generally vertical air passages communicatively connected to an air passage disposed within a liquid storage tank and the air passage disposed within a liquid storage tank further comprising air outflow ports, and one or more fans disposed within one or more air passages located within the one or more generally vertical air passages and the air passage disposed within the roof cap;
    Transferring heated air from within a liquid storage tank to a building by means of one or more air passages disposed generally over the surface of the liquid storage tank, the one or more air passages communicating with air space disposed over the surface of the liquid contained within the liquid storage tank and further communicating with the interior portion of a building;

Transferring heated air from the interior of a building to an air circulating system, wherein the air circulating system is comprised of one or more air passages disposed within the roof building of a building and one or more air passages disposed within the roof building of a building communicatively connected to an air passage disposed within a roof cap; and Flowing heated air through an air passage disposed within a liquid storage tank, Venting heated air to the exterior of an air circulation system by means of one or more exhaust outlets disposed within the air circulation system, the one or more exhaust outlets venting to the atmosphere outside of a building.

14. The method of claim 13, wherein air directed to the one or more generally vertical air passages is redirected to one or more exhaust outlets, and wherein those exhaust outlets either direct air to the exterior of the building or direct air into an air circulating system for the building.

15. The method of claim 13, wherein heated air is captured from passages contained within the interior portion of the roof of a building.

16. A method of capturing and storing heated air, comprising the steps of allowing air to be heated by ambient sunlight while the said air is disposed within passages between the surface of a roof and substantially transparent panels disposed upon supports connected to the substantially transparent panels and the surface of the roof.

17. The method of claim 16, wherein heated air rises within the passages between the surface of the roof and the substantially transparent panels and thence into an air circulation system.

18. The method of claim 13, wherein the said air circulation system comprises means to capture air heated within a roof top solar air heating apparatus, means to communicate heated air from a roof top solar air heating apparatus to a liquid storage tank; means to communicate heated air from a liquid storage tank to the interior of a building.

19. The method of claim 13, wherein said heated air is selectively communicated either the exterior of a building or into an air circulating system of a building by means of a valve disposed within the one or more generally vertical air passages.

20. The method of claim 13, further comprising the step of: controlling the flow of air within air passages communicatively connected to a rooftop solar heating apparatus and communicatively connected to a liquid storage tank by means of a fan, operation of the fan controlled by a thermostat and temperature sensor, the temperature sensor disposed within the liquid storage tank and sensing the temperature of a liquid disposed within the liquid storage tank.

* * * * *